(12) United States Patent
Rangarajan et al.

(10) Patent No.: US 7,797,473 B2
(45) Date of Patent: Sep. 14, 2010

(54) SYSTEM FOR EXECUTING SYSTEM MANAGEMENT INTERRUPTS AND METHODS THEREOF

(75) Inventors: Madhusudhan Rangarajan, Round Rock, TX (US); Vijay Nijhawan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 203 days.

(21) Appl. No.: 12/133,580

(22) Filed: Jun. 5, 2008

(65) Prior Publication Data

US 2009/0307403 A1 Dec. 10, 2009

(51) Int. Cl.
*G06F 13/24* (2006.01)

(52) U.S. Cl. .................................... 710/260
(58) Field of Classification Search .............. 710/200, 710/260–269
See application file for complete search history.

(56) References Cited

U.S. PATENT DOCUMENTS

| | | | | |
|---|---|---|---|---|
| 4,587,609 | A * | 5/1986 | Boudreau et al. | 710/200 |
| 5,274,809 | A * | 12/1993 | Iwasaki et al. | 718/104 |
| 5,515,538 | A * | 5/1996 | Kleiman | 710/260 |
| 5,530,891 | A * | 6/1996 | Gephardt | 710/8 |
| 5,890,003 | A * | 3/1999 | Cutts et al. | 710/263 |
| 6,093,213 | A | 7/2000 | Favor et al. | |
| 6,442,631 | B1 * | 8/2002 | Neufeld et al. | 710/107 |
| 6,453,278 | B1 | 9/2002 | Favor | |
| 6,782,440 | B2 * | 8/2004 | Miller | 710/200 |
| 7,200,701 | B2 | 4/2007 | Stultz | |
| 7,363,411 | B2 * | 4/2008 | Kobayashi et al. | 710/261 |
| 7,433,985 | B2 * | 10/2008 | Ayyar et al. | 710/260 |
| 7,493,435 | B2 * | 2/2009 | Kobayashi et al. | 710/260 |
| 7,500,040 | B2 * | 3/2009 | Gupta et al. | 710/302 |
| 7,594,234 | B1 * | 9/2009 | Dice | 718/108 |
| 2005/0102447 | A1 | 5/2005 | Stultz | |
| 2006/0179199 | A1 | 8/2006 | Stern et al. | |
| 2009/0307707 | A1 * | 12/2009 | Gellerich et al. | 718/107 |

OTHER PUBLICATIONS

U.S. Appl. No. 11/838,409, filed Aug. 14, 2007.

* cited by examiner

*Primary Examiner*—Paul R Myers
(74) *Attorney, Agent, or Firm*—Larson Newman & Abel, LLP

(57) ABSTRACT

An information handling system includes a first processor device to execute a handler in response to a system management interrupt (SMI). While the first processor device executes the SMI handler, a second processor device of the information handling system can continue to execute software and perform other operations in a normal mode. When the first processor device accesses a shared resource in executing the SMI handler, an SMI trap for the shared resource is enabled. In response to the second processor device triggering the SMI trap by accessing the shared resource, the second processor device enters an SMI mode, thereby suspending execution of software and other operations. Accordingly, a second processor device is allowed to continue normal operations while a first processor device executes an SMI handler, improving system efficiency while preventing shared resource conflicts.

20 Claims, 4 Drawing Sheets

SYSTEM FOR EXECUTING SYSTEM MANAGEMENT INTERRUPTS AND METHODS THEREOF

FIELD OF THE DISCLOSURE

The present disclosure relates to information handling systems, and more particularly to system management interrupts for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

Some information handling systems can employ a system management mode to address system level errors and events, such as power management events. Typically, the system management mode is triggered when a processor device of the information handling system receives a system management interrupt (SMI) indicating the system level error or event. In response, the processor device executes an SMI handler to address the error or event. However, in information handling systems including multiple processors, processing of such SMIs can degrade overall system performance.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a wireless communication device, a diskless computer system, a thin client, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

As further described herein, an information handling system can include a first processor to execute a handler in response to a system management interrupt (SMI). While the first processor executes the SMI handler, a second processor of the information handling system can continue to execute software and perform other operations in a normal mode. When the first processor accesses a shared resource in executing the SMI handler, an SMI trap for the shared resource is enabled. In response to the second processor triggering the SMI trap by accessing the shared resource, the second processor is placed in an SMI mode, thereby suspending execution of software and other operations. Accordingly, a second processor is allowed to continue normal operations while a first processor executes an SMI handler, improving system efficiency while preventing shared resource conflicts.

Figure 1:
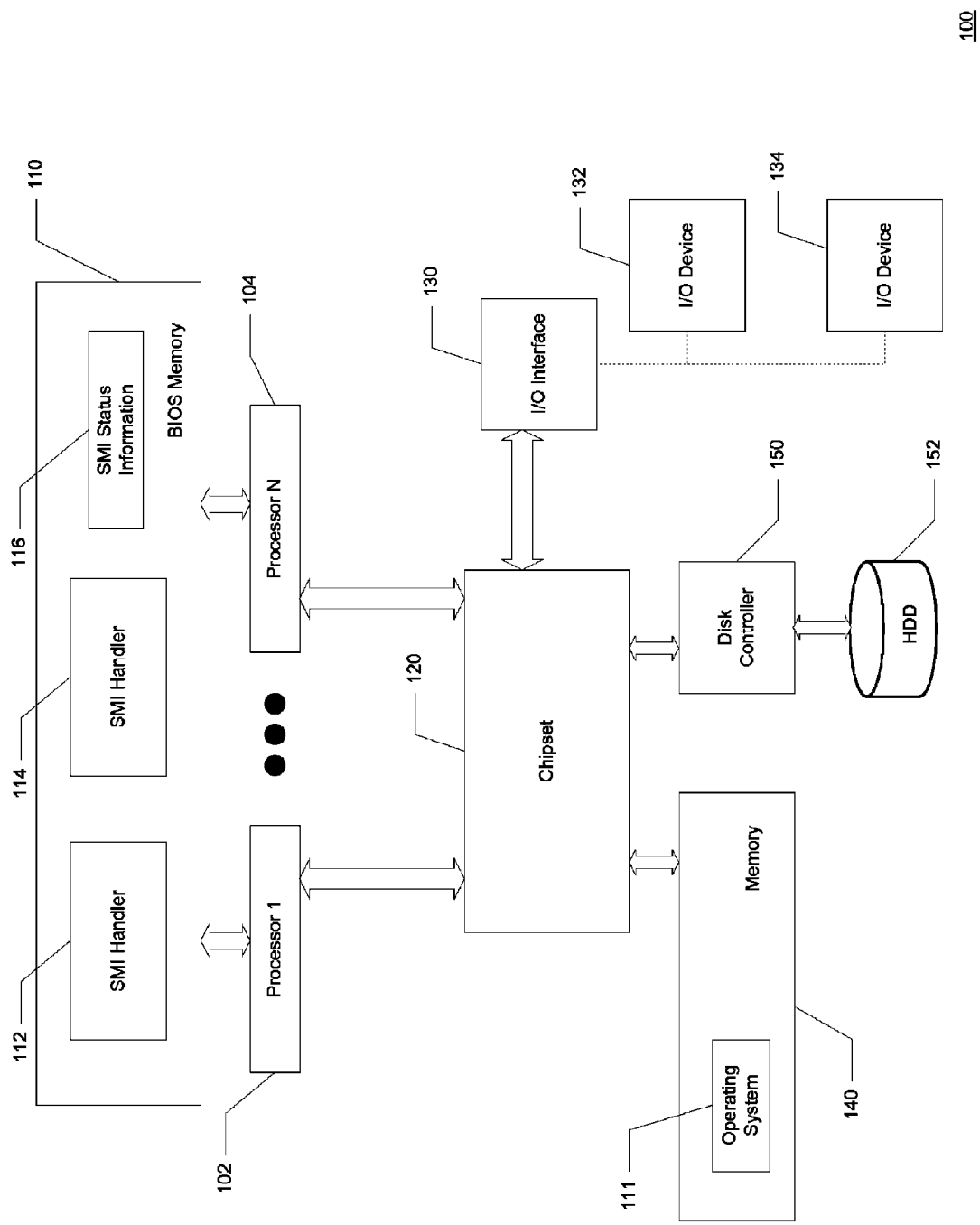
FIG. 1 is a block diagram of an information handling system in accordance with one embodiment of the present disclosure.

FIG. 1 illustrates a block diagram of an exemplary embodiment of an information handling system, generally designated at 100. In one form, the information handling system 100 can be a computer system such as a server. As shown in FIG. 1, the information handling system 100 includes a first processor 102 device 102 additional processor devices through Nth processor device 104. As used herein, a processor device refers to a device configured to execute instructions to perform specified tasks. Accordingly, a processor device can be a processor core, central processing unit (CPU), and the like.

Each of the processors 102 through 104 is connected to a chipset 120 via a bus. Each of the processors 102 through 104 is connected to a BIOS memory 110 via a bus. The chipset 120 is connected to an input/output (I/O) device interface 130 via a bus, and is also connected to a memory 140 and a disk controller 150. The I/O interface 130 is connected to I/O devices 132 and 134. The disk controller 150 is connected to a hard disk drive (HDD) 152.

The chipset 150 is configured to provide an interface between the processor devices 102 through 104, the memory 120, the disk controller 150, and the I/O interface 130. In one embodiment, the chipset 120 can include an application specific chipset that connects to various buses, and integrates other system functions. For example, the chipset 120 can include a Northbridge/Southbridge chipset configuration (not illustrated). For example, a Northbridge portion of the chipset 120 can communicate with the processors 102 through 104 102 and can control interaction with the memory 140, the I/O bus 120 that can be operable as a PCI bus, and activities for the video graphics interface 122. The chipset 120 can also include a Southbridge portion (not illustrated) of the chipset 120 and can handle I/O functions of the chipset 120. The Southbridge portion can manage the basic forms of I/O such as Universal Serial Bus (USB), serial I/O, audio outputs, Integrated Drive Electronics (IDE), and ISA I/O for the information handling system 100.

In the illustrated embodiment, the chipset 120 communicates with the processors 102 through 104 and the memory 140, the disc controller 150, and the I/O interface in a message-based format. Accordingly, the chipset 120 can receive a message from one of the processors 102 through 104, the memory 140, the disk controller 150, and the I/O interface 130, determine a destination of the message, and communicate the message or information based on the message to the destination. In the illustrated embodiment, the chipset 120 determines the destination based on an address of the message. Each address identifies a location of the memory 140, one of the I/O devices 132 and 134, a location of the HDD 152, and one or more ports, storage locations, or other portions of the processors 102 through 104. This allows a common message format to be employed in communications between the illustrated devices of the information handling system 100. The chipset 120 can control all communication functions, such as synchronization, message formatting, and the like, to facilitate communications between the devices.

The memory 140 is a volatile memory (e.g. Random Access Memory (RAM)) configured to store information based on messages communicated by the chipset 120. In the illustrated embodiment, the memory 140 can store software programs that can be executed by one or more of the processor devices 102 through 104. For example, the memory 140 stores an operating system 111. When executed at one of the processor devices 102 through 104, the operating system 111 can manage operation of other software programs executed at the processor devices. For example, the operating system 111 can manage the communication of a software program with the memory 140 and the I/O interface 130.

The I/O interface 130 is configured to provide an interface between the chipset 120 and the I/O devices 132 and 134. For example, the I/O interface 130 can be a PCI Express bus controller, a disk controller, and the like. The I/O devices 132 can be any devices that can provide input information to the information handling system 100, render output information, or any combination thereof. Examples of input/output devices can include computer mice, keyboards, soundcards, video cards, cameras, personal music players, and the like.

The disk controller 150 is configured to provide an interface between the chipset 120 and the HDD 152. Accordingly, in response to messages from the chipset 120, the disk controller 150 can store information at, or retrieve information from, the HDD 152.

Each of the memory 140, the disk controller 150 and hard drive 152, the I/O interface 130 and I/O devices 132 and 134, and other devices of the information handling system 100 are shared resources of the processors 102 through 104. As used herein, a "shared resource" of an information handling system refers to a device, memory location, function, or other portion of the information handling system that can be accessed by more than one processor device during normal execution of software.

The BIOS memory 110 is configured to store BIOS and other configuration information for the information handling system 100. During a boot process of the system, a designated bootstrap processor (one of the processor devices 102 through 104) can access the BIOS information at the BIOS memory 110 to configure the information handling system 100. In addition, the processor devices 102 through 104 can access information stored at the BIOS memory 110 during operation of the system as described below.

During operation, the processor devices 102 through 104 can operate in a normal mode of operation, where each processor executes software in a normal specified fashion. In the normal mode of operation, each of the processor devices 102 through 104 can execute software in a dedicated fashion, where all the tasks requested by a software program are executed at a single processor, or in shared fashion, where tasks requested by a software program can be shared between processor devices. For example, in an embodiment, the operating system (OS) 111 can be executed at both the processor devices 102 and 104, where each task requested by the OS 111 is assigned to a program thread, and each program thread is assigned to one of the processor devices 102 and 104 for execution. Thus, the OS 111 can request a memory access be performed by the processor 102 via a first program thread, and request via a second program thread that the processor device 104 interface with the I/O device 132.

While executing in the normal mode, the processor devices 102 through 104 can individually receive system management interrupts (SMIs). An SMI can be triggered by any of a number of system events, such as memory errors, I/O errors, software errors (such as errors that require access to BIOS or other configuration information), power management events, and the like. The processor associated with the SMI is notified of the SMI request via an SMI message. The message can be communicated by any of the memory 140, the chipset 120, the I/O interface 130, the I/O devices 132 and 134, the disk controller 150, or any other device of the information handling system 100. In addition, each of the processors 102 through 104 can internally generate an SMI by creating an SMI message.

In response to receiving an SMI message, the processor device associated with the SMI enters an SMI mode of operation. In the SMI mode of operation, the processor device suspends execution of software at the processor device. The processor device can also take other actions, such as saving the internal state of the processor device or other device of the information handling system 100. For example, information held at the processor device can be copied to the memory 140, the BIOS memory 110, or other memory.

Further, in the SMI mode the processor device executes one or more SMI handlers, depending on the reason for the SMI, as indicated by the SMI message that triggered the interrupt. This allows the processor device to take appropriate action in response to the event that caused the SMI to be generated. After completing execution of the SMI handlers, the processor device returns to normal mode of operation. To return to normal mode, the processor device can retrieve any previously stored state information and resume execution of software at the processor device.

When one of the processor devices 102 through 104 enters SMI mode, the other processor devices remain in normal mode and continue to execute software normally. Thus, the processor device that enters SMI mode enters a local SMI mode whereby other processor devices remain in normal mode. This reduces the impact of an SMI event on the efficiency of the information handling system 100.

During execution of an SMI handler, the processor device in local SMI mode can access shared resources of the information handling system 100. These shared resources can also be accessible to the other processor devices in normal mode. However, access of a shared resource while that resource is being accessed by the SMI handler can lead to resource conflicts and undesirable errors in the operation of the information handling system 100. Accordingly, in order to prevent resource conflicts, an SMI trap can be enabled in response to the processor device accessing a shared resource. Once the processor device has completed access of the shared resource, the SMI trap is disabled.

If a processor device in the normal mode attempts to access a shared resource associated with an enabled SMI trap, this indicates a potential resource conflict. Accordingly, the SMI trap is triggered and, in response, each processor device in the normal mode of operation is placed in SMI mode. Thus, execution of software at all processor devices is suspended, state information for each processor device is saved, and other actions are taken to place each processor device in SMI mode.

In the illustrated embodiment of FIG. 1, the mode of operation for each of the processor devices 102-104 is determined based on the SMI status information 116 stored at the BIOS memory 110. Accordingly, in response to one of the processor devices entering SMI mode, the SMI status information is updated to reflect the mode change. However, the SMI status information for other processors remains unchanged, allowing the other processors to remain in normal mode. In the event an SMI trap is triggered, the SMI status information 116 is updated to indicate that all processors of the information handling system 100 should be in SMI mode. In response, each of the processor devices 102 through 104 (other than the processor device already in SMI mode) enters SMI mode. In one embodiment, each of the processor devices 102 through 104 can periodically poll the SMI status information 116 to determine the mode of operation for the processor device. In other embodiment, a change in the SMI status information 116 can trigger a message to place the processor devices 102 through 104 in the indicated mode.

In response to the processor device executing the SMI handler completing execution of the handler, the processor devices 102 through 104 are all returned to the normal mode of operation. Further, if one of the processor devices triggered an SMI trap, an I/O restart bit for the processor device is set, indicating that the shared resource access request that triggered the SMI trap was not completed, and should be reinitiated.

In the illustrated embodiment, SMI traps are managed by the chipset 120. In particular, when a processor executing an SMI handler accesses a shared resource, an indication can be provided to the chipset 120 to enable an SMI trap for the resource. In response, the chipset 120 monitors access requests for the shared resource by other processor devices. If an access request is received while the trap is enabled, the chipset 120 notifies the information handling system 100 that the SMI trap has been triggered.

Figure 2:
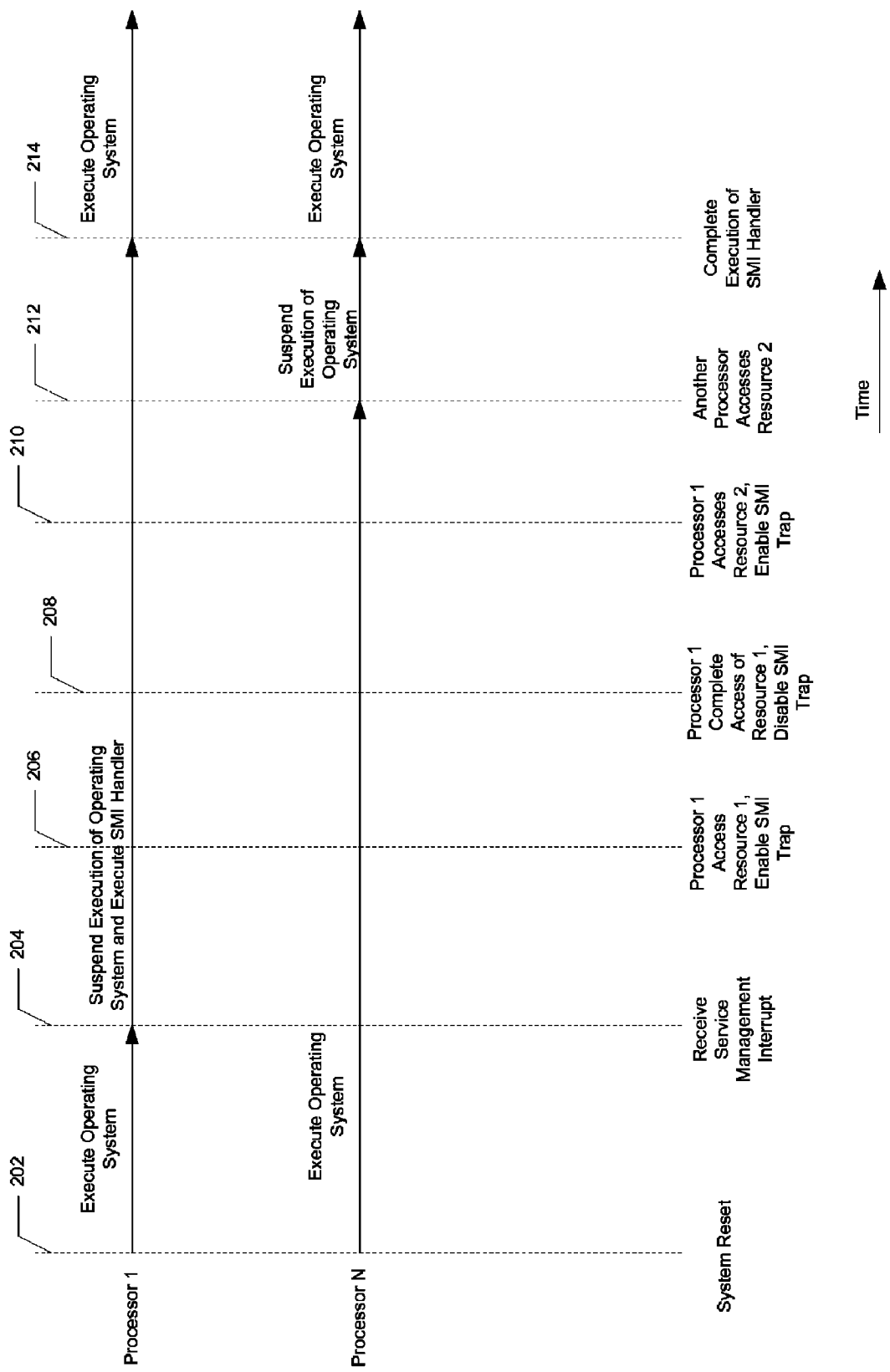
FIG. 2 is a diagram illustrating a particular embodiment of an execution flow for the information handling system of FIG. 1.

The operation of the information handling system 100 in the normal and SMI modes can be better understood with reference to FIG. 2, which illustrates a particular embodiment of an execution flow for the system. The illustrated example of FIG. 2 shows modes of operation for the processor devices 102 and 104 over an exemplary period of time. Between times 202 and 204, each of the processor devices 102 and 104 are in a normal mode of operation, and execute software normally. In the illustrated embodiment of FIG. 2, the software being executed at each processor device is an operating system, but in other embodiments could be any software.

At time 204, an SMI is received at processor device 102. In response, the processor device enters SMI mode, suspends execution of the operating system, and executes an SMI handler. The processor device 104 remains in normal mode, and continues to execute the operating system normally. At time 206, the processor device 102, in the course of executing the SMI handler, begins access a shared resource of the information handling system 100. In response, an SMI trap for the accessed resource is enabled at chipset 120. At time 208, the processor device 102 completes access of the shared resource. In response, the chipset 120 disables the SMI trap for the resource. Because no other processor device attempted to access the shared resource while it was being accessed by the processor device 102, the SMI trap was not triggered. Accordingly, between times 206 and 208 the processor device 104 remains in normal mode and continues to execute the operating system.

At time 210, the processor device 102, in the course of executing the SMI handler, initiates access to another shared resource of the information handling system 100. In response, an SMI trap for the accessed resource is enabled at chipset 120. At time 212, another processor device (other than processor device 102) requests access to the shared resource. In response, the chipset 120 indicates that the SMI trap has been triggered. This causes the other processor devices, including processor device 104, to enter SMI mode. Accordingly, execution of the operating system at the processor 104 is suspended at time 212. At time 214, the processor 102 completes execution of the SMI handler. In response, the processor devices 102 through 104 are returned to normal mode, and both the processor devices 102 and 104 return to execution of the operating system.

Thus, in the illustrated embodiments of FIGS. 1 and 2, the impact of an SMI on system performance is reduced relative to a conventional system that places all processors in SMI mode in response to an SMI interrupt. For example, as illustrated in FIG. 2, processor devices not executing the SMI handler can continue to execute software until a potential resource conflict occurs. Further, if no such potential conflict arises, the processor devices do not enter SMI mode at all, further reducing the impact of an SMI on system performance. In addition, in the illustrated embodiments of FIGS. 1 and 2 the processor devices 102 and 104 can be independent CPUs, or can each be an individual core of a multi-core processor. Thus, in the illustrated embodiments, a core of the multi-core processor can execute an SMI handler while other cores continue in a normal mode of operation. In the event one of the cores triggers an SMI trap by accessing a shared resource, all of the cores automatically enter SMI mode and suspend execution of software.

Figure 3:
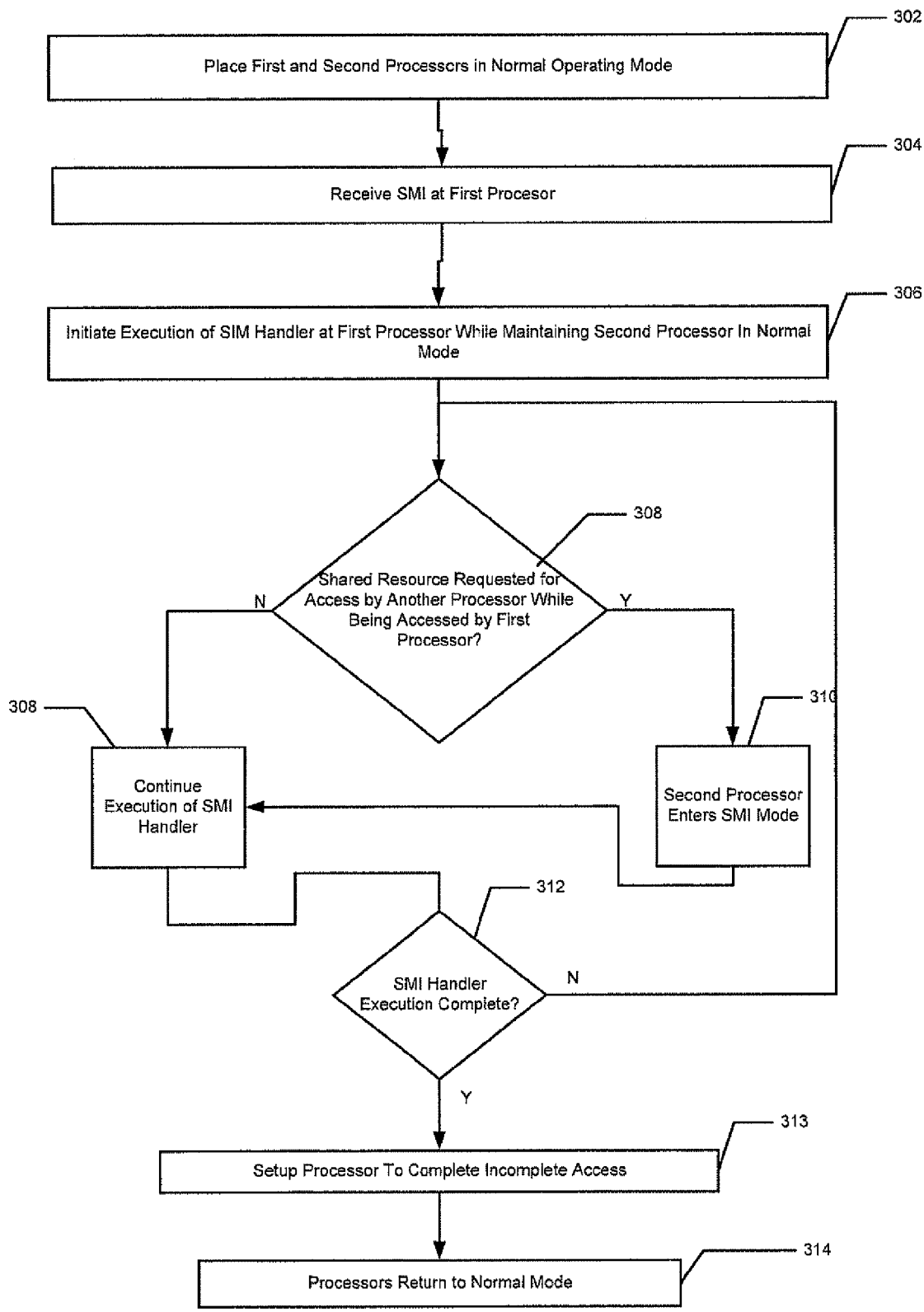
FIG. 3 is a flow diagram illustrating a method of executing a system management interrupt (SMI) handler in accordance with one embodiment of the present disclosure.

Referring to FIG. 3, a flow diagram of a particular embodiment of a method of executing an SMI handler is illustrated. At block 302, a first processor device and a second processor device are placed in a normal mode of operation, whereby each processor device executes software and performs other normal operations. At block 304, an SMI is received at the first processor device. In response, at block 306, the first processor device initiates execution of an SMI handler associated with the SMI. In addition, the second processor device is maintained in the normal mode of operation, allowing the second processor to continue execution of software and other normal operations.

At block 308, it is determined whether a shared resource that is being accessed by the first processor device has been requested for access by another processor device. If so, the second processor is placed in SMI mode at block 310. Accordingly, execution of software is suspended at the second processor. At block 308, the first processor continues execution of the SMI handler. At block 312, it is determined whether execution of the SMI handler is complete. If not, the method flow returns to block 308. If execution of the SMI handler is complete, the method flow moves to block 313 and any processor devices whose shared resource accesses that were not completed due to the processor requesting the access entering SMI mode are setup to complete the requested access. For example, a status bit can be set indicating to the processor device that the request shared resource access was not completed and the processor device should resubmit the access request. The method flow proceeds to block 314 and the first and second processor device are placed in normal mode to continue execution of software and other normal operations.

Figure 4:
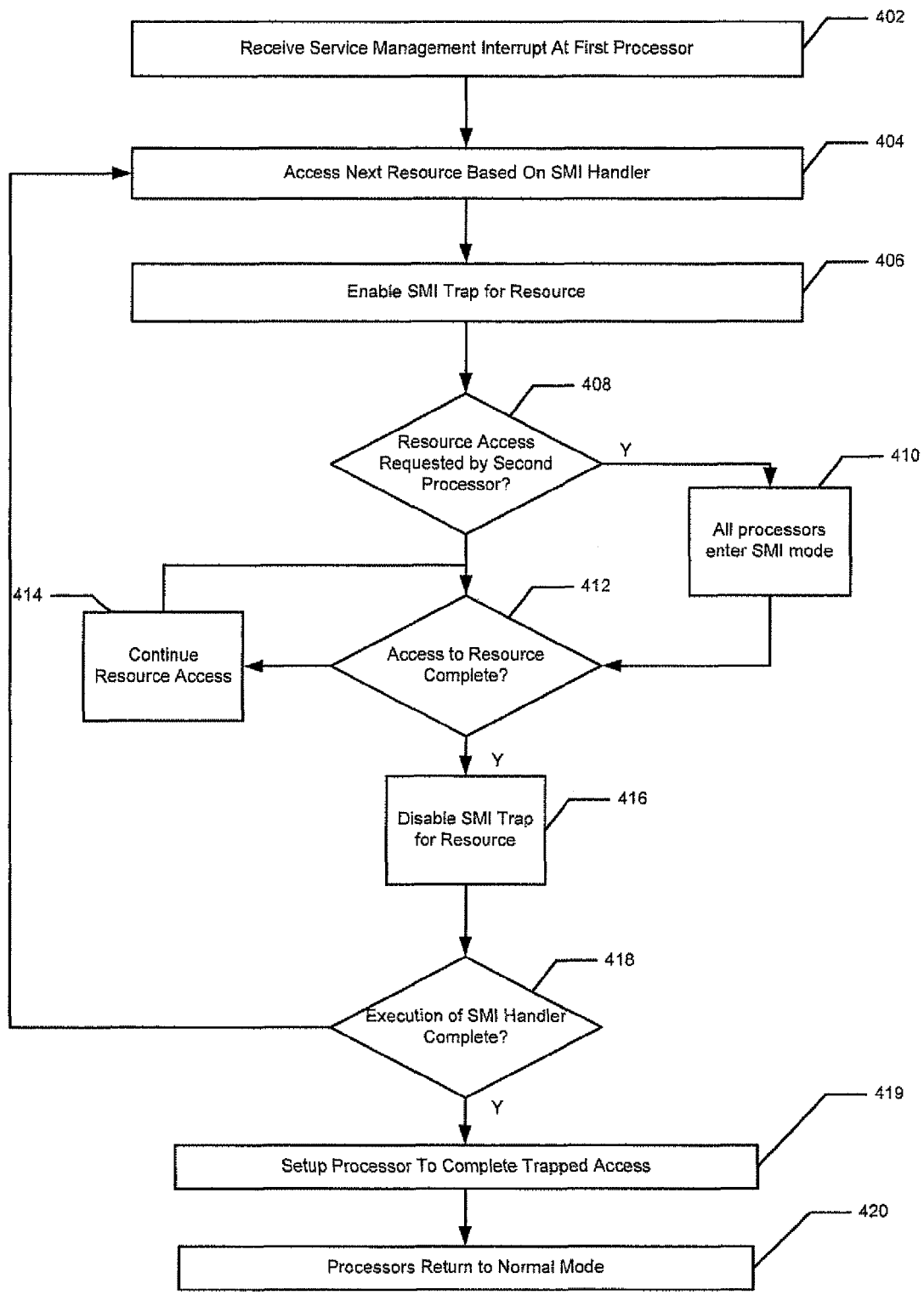
FIG. 4 is a flow diagram illustrating a method of executing a system management interrupt (SMI) handler in accordance with another embodiment of the present disclosure.

Referring to FIG. 4, a flow diagram of an alternative embodiment of a method of executing an SMI handler is illustrated. At block 402, an SMI interrupt is received at a first processor device of an information handling system having multiple processor devices. In response, the first processor device is placed in SMI mode and begins execution of an SMI handler, while the other processor devices remain in normal mode. At block 404, based on the SMI handler the first processor device requests access to a shared resource. In response, at block 406, an SMI trap is enabled for the requested resource.

At block 408, it is determined whether a second processor device of the information handling system has requested access to the shared resource for which the SMI trap is enabled. If so, the method flow moves to block 410 and the processor devices other than the first processor device enter SMI mode. In an embodiment, the processor devices automatically enter SMI mode in response to the SMI trap being triggered by the requested access. For example, in one embodiment triggering of an SMI trap causes a status bit to be set. The setting of this status bit automatically causes the processor devices to enter SMI mode. Accordingly, execution of software at the other processor devices is suspended.

At block 412, it is determined whether the first processor device has completed access of the shared resource for which the trap is enabled. If not, the method flow moves to block 414 and the first processor device continues to access the resource. If the resource access is complete, the method flow moves to block 416 and the SMI trap for the shared resource is disabled.

At block 418, it is determined whether the first processor device has completed execution of the SMI handler. If not, the method flow returns to block 404 and the first processor accesses the next shared resource as indicated by the SMI handler. If, at block 418, it is determined that the first processor device has completed execution of the SMI handler, the method flow moves to block 419 and the processor device, if any, that triggered the SMI trap is setup to complete the resource access request that triggered the trap. For example, a resource access status bit can be set indicating to the processor device that the resource access request that triggered the SMI trap should be resubmitted. This ensures that, upon the processor device re-entering the normal mode of operation, the resource access will be completed, reducing the likelihood of errors and allowing the entry of the processor device into SMI mode to be transparent to software executing at the device. The method flow moves to block 420 and the processor devices of the information handling system return to normal mode, allowing normal execution of software. It will be appreciated that, as used herein, a processor device returning to normal mode can include maintaining the processor device in the normal mode or changing the mode of the processor device from the SMI mode to normal mode. Thus, if a processor device did not enter the SMI mode (e.g. because no SMI trap was triggered), the processor device is placed in the normal mode by allowing it to continue in the normal mode.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   for a first phase and a second phase, executing a system management interrupt (SMI) handler at a first processor device of an information handling system in response to a first system management interrupt;
   executing first software at a second processor device of the information handling system while executing the first SMI handler, the first software executed during the first phase;
   suspending execution of the first software at the second processor device for the second phase in response to the first software requesting access to a first shared resource of the information handling system; and
   entering an SMI mode at the second processor device in response to suspending execution of the first software.

2. The method of claim 1, further comprising executing the first software for the second phase in response to the first software not requesting access to the first shared resource.

3. The method of claim 1, further comprising:
   enabling a first SMI trap for the first shared resource during the first phase in response to the SMI handler accessing the first shared resource;
   wherein suspending execution of the first software comprises suspending execution of the first software in response to an indication that the first SMI trap has been activated.

4. The method of claim 3, further comprising:
   disabling the first SMI trap in response to an indication that the SMI handler has completed accessing the first shared resource.

5. The method of claim 3, further comprising:
   enabling a second SMI trap for a second shared resource during the first phase in response to the SMI handler accessing the first shared resource; and
   suspending execution of the first software in response to an indication that the second SMI trap has been activated.

6. The method of claim 1, further comprising:
executing second software during the first phase at a third processor device of the information handling system; and
suspending execution of the second software during the second phase in response to the first software accessing the first shared resource.

7. The method of claim 1, wherein suspending execution of the first software comprises resuming execution of the first software in response to an indication that the SMI handler has completed execution.

8. The method of claim 7, wherein suspending execution of the first software comprises instructing the second processor device to complete a requested access of the first shared resource.

9. The method of claim 1, wherein the first software is an operating system.

10. The method of claim 1, wherein the first shared resource is selected from the group consisting of an input/output device, and a memory location.

11. An information handling system, comprising:
a first computer readable medium configured to store a system management interrupt (SMI) handler comprising instructions to manipulate a processor;
a second computer readable medium configured to store first software comprising instructions to manipulate a processor;
a first processor device configured to execute the SMI handler for a first phase and a second phase in response to a system management interrupt;
a second processor device configured to execute the first software during the first phase, and to suspend execution of the first software and enter an SMI mode for the second phase in response to the first software requesting access to a shared resource of the information handling system.

12. The information handling system of claim 11, wherein the second processor device is configured to maintain execution of the first software during the second phase in response to the first software not requesting access to the shared resource.

13. The information handling system of claim 11, further comprising:
a chipset configured to enable a first SMI trap associated with the first shared resource in response to the SMI handler requesting access to the first shared resource and configured to send a message to the second processor device to suspend execution of the first software in response to receiving a request to access the first shared resource while the first SMI trap is enabled.

14. The information handling system of claim 13, wherein the chipset is configured to disable the first SMI trap in response to the SMI handler completing a requested access of the first shared resource.

15. The information handling system of claim 14, wherein the chipset is configured to enable a second SMI trap associated with a second shared resource in response to the SMI handler requesting access to the second shared resource, and wherein the second processor device is configured to suspend execution of the first software for the second phase in response to the first software requesting access to the second shared resource.

16. The information handling system of claim 11, further comprising a third processor device configured to execute second software during the first phase and to suspend execution of the second software for the second phase in response to the first software requesting access to a shared resource of the information handling system.

17. The information handling system of claim 11, wherein the second processor device is configured to resume execution of the first software after the second phase in response to the first processor device completing execution of the SMI handler.

18. An information handling system, comprising:
a memory configured to store a system management interrupt (SMI) handler;
a first processor device configured to execute the SMI handler in response to a first SMI input; and
a second processor device configured to remain in a normal mode when the first processor initiates execution of the SMI handler, and configured to enter an SMI mode in response to requesting access of a shared resource.

19. The information handling system of claim 18, further comprising a chipset configured to:
enable an SMI trap associated with the shared resource in response to the first processor accessing the first shared resource while executing the SMI handler; and
communicate a message to the second processor to enter the SMI mode in response to receiving an indication that the second processor has requested access to the shared resource while the SMI trap is enabled.

20. The information handling system of claim 18, further comprising a third processor device configured to remain in normal mode when the first processor initiates execution of the SMI handler, and configured to enter SMI mode in response to the second processor device requesting access of the shared resource.

* * * * *